United States Patent [19]

Siegel et al.

[11] Patent Number: 5,012,468
[45] Date of Patent: Apr. 30, 1991

[54] MASTER SLAVE INDUSTRIAL TOKEN PASSING NETWORK

[75] Inventors: Stuart B. Siegel, Canton; Jeffery C. Marriott, Ann Arbor, both of Mich.

[73] Assignee: Allen-Bradley Company, Inc., Milwaukee, Wis.

[21] Appl. No.: 458,108

[22] Filed: Dec. 28, 1989

[51] Int. Cl.$^5$ .............................................. H04J 3/24
[52] U.S. Cl. .................................. 370/85.5; 370/85.6; 370/85.4; 340/825.05
[58] Field of Search .................. 370/85.4, 85.15, 85.5, 370/85.6, 85.7; 340/825.05, 825.06, 825.5; 364/134

[56] References Cited

U.S. PATENT DOCUMENTS

| | | | |
|---|---|---|---|
| 4,304,001 | 12/1981 | Cope | 364/132 |
| 4,667,323 | 5/1987 | Engdahl et al. | 370/85.4 |
| 4,747,100 | 5/1988 | Roach et al. | 370/85.5 |

Primary Examiner—Benedict V. Safourek
Assistant Examiner—Una Kim
Attorney, Agent, or Firm—Quarles & Brady

[57] ABSTRACT

A communications network is comprised of master and slave stations. The master stations may receive a master token allowing control of the network for sending messages, and a solicit token that allowing the master stations to solicit other master stations for entry into the network. A master station receiving a solicit message answers with an acknowledgement signal and may immediately begin soliciting for successors. The slave stations receiving a solicit message may not accept the master token or the solicit token but must respond with a negative acknowledgement. Slave stations enter the network to respond to messages only. The use of slave stations allows for the implementation of simpler networks and improves network efficiency. The negative acknowledgement identifies the presence of the slave stations and allows detection of duplicate network nodes.

5 Claims, 5 Drawing Sheets

MASTER STATION PROTOCOL

FIG. 4
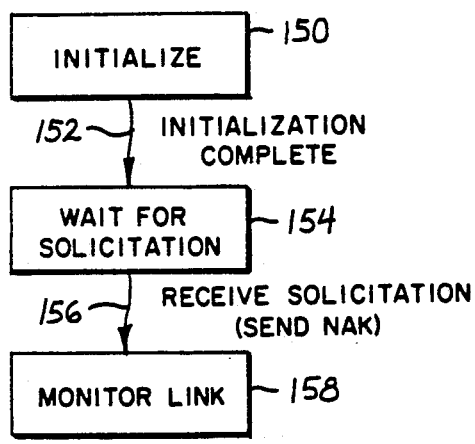
FIG. 5
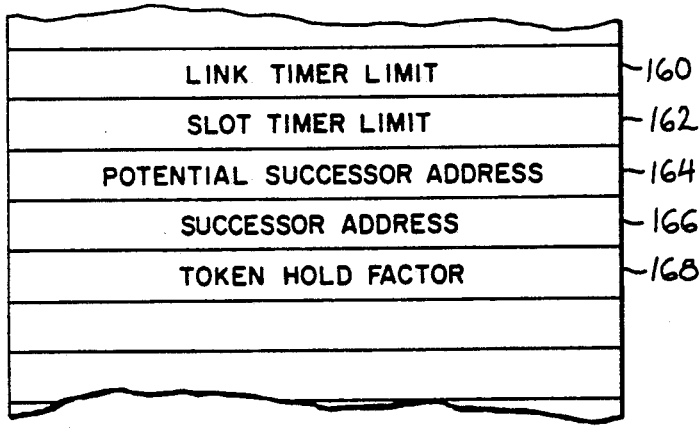
FIG. 6a
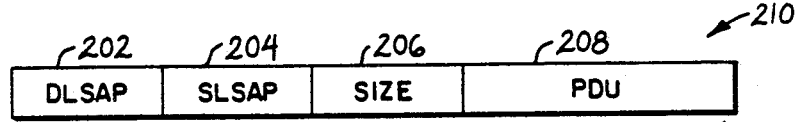
FIG. 6b
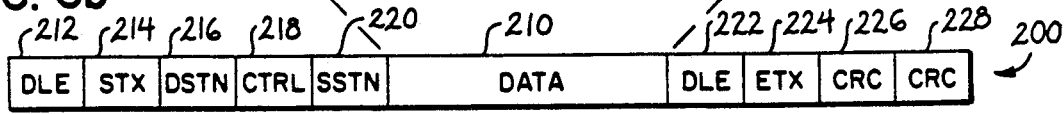
FIG. 6c

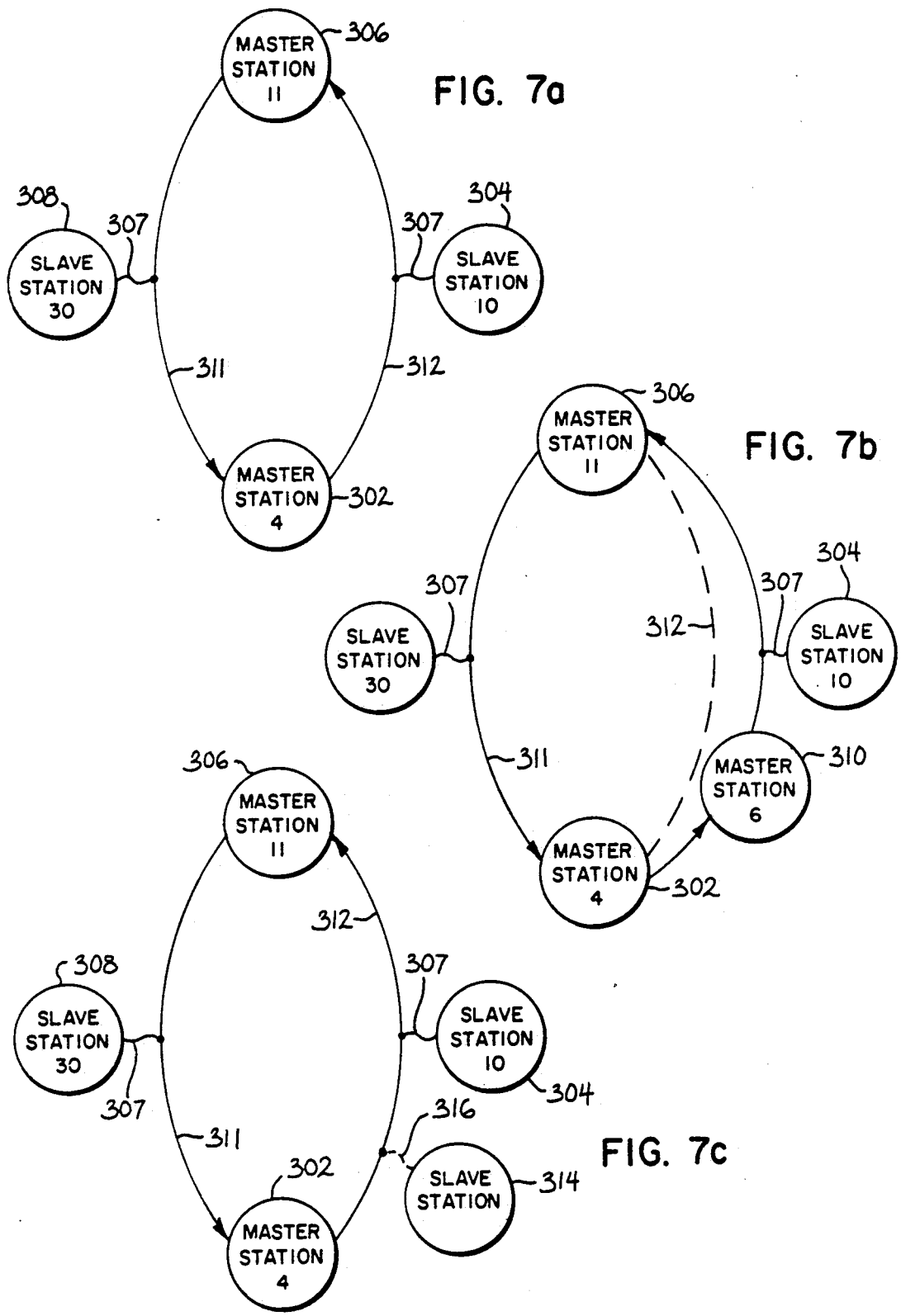

MASTER SLAVE INDUSTRIAL TOKEN PASSING NETWORK

BACKGROUND OF THE INVENTION

The field of the invention is industrial control systems including programmable controllers, and more particularly, local area networks for linking such controllers and associated peripheral devices together.

Local area networks are comprised of two or more nodes or stations which are linked together by a communications medium. The communications medium may take a number of forms, including coaxial cable, fiber optics or twisted wire pairs. The topology of the links between stations may also take a number of forms, including star, multidrop or ring configuration.

Regardless of the medium used or the topology of the network, a control scheme is required to provide an orderly transfer of information from one station to another on the network. One such system for the orderly transfer of information between stations is the token passing system. With a token passing system, a master token in the form of a distinctive bit pattern is passed between stations on the network. While a station has the master token, it can transmit messages to other stations or command other stations to transmit messages.

In order to permit additional stations to join the network, a second "solicit" token may be passed between stations. Typically, each station holding both the master token and the solicit token may solicit other stations to enter the network. Conversely, a station holding the master token may withdraw from the network by sending a withdrawal message to its predecessor station An example of such a token passing system adapted for use in an industrial environment is given in U.S. Pat. No. 4,667,323 entitled "Industrialized Token Passing Network" issued May 19, 1987, assigned to the same assignee as the present invention and hereby incorporated by reference.

Token passing systems are desirable for industrial control applications because token rotation time and throughput can be accurately estimated provided the number and type of stations in the ring is known. U.S. Pat. No. 4,747,100, entitled: "Token Ring Network Utilizing Active Node Table" and issued May 24, 1988 discloses a token ring system where each station compiles an active node table listing the other active stations and permitting estimation of token rotation time and throughput as described above. The use of an active node table also permits simplified network maintenance, e.g. adding and dropping stations, and permits recovery from multiple station failures without reinitializing the network.

The above described token ring systems require that each station share the burden of network maintenance, i.e. adding or dropping stations from the network. If an active node table is used, each station must also have adequate memory and processing capability to support the active node table.

SUMMARY OF THE INVENTION

In the present invention, a network is formed by at least one master and one master or slave station interconnected by a communications medium. A master token and a solicit token is passed to each master station in a predetermined order enabling each master station to send a solicit message on the network when it has possession of both the master token and the solicit token. The solicit message is directed to a recipient station connected to the communications media but not presently one of the stations receiving the master token. If the recipient station is a master station, the recipient station is permitted to become one of the stations receiving the master token and the solicit token. If the recipient station is a slave station, it sends a negative acknowledgement message on the communication medium but does not become one of the stations receiving the master token.

It is a general object of the invention to permit the addition of simpler or less expensive slave stations to a network. The slave stations may respond to messages initiated by master stations but do not initiate messages or support network maintenance including the adding or dropping of stations.

It is a further object of the invention to increase network efficiency. Slave stations which do not initiate messages or support network maintenance, do not need to accept the master token and hence do not materially decrease the speed with which the master token passes around the logical ring.

It is another object of the invention to permit the addition of slave stations to a network without jeopardizing the integrity of the network. The slave stations respond to a solicit message with a negative acknowledgement message which permits other stations to detect duplicate stations at a single station address.

When a recipient master station enters the network, the solicit token is immediately passed to the recipient master station if the network address of its successor station is not one greater than the network address of the recipient station.

It is another object of the invention to speed the network initialization. By allowing each recipient station to immediately solicit for successors, rather than waiting for the full cycle of the master token about the network, all stations may be rapidly connected to the network. This is particularly critical during network initialization when many stations must be added to the network by the solicitation process.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 4 is a state diagram of the slave station protocol implemented by the media access controller of FIG. 2;

FIG. 5 is a representational memory map of the variables used in/ the/master protocol of FIG. 3;

FIGS. 6a, 6b and 6c are a schematic representation of the structure of the messages which are sent on the network of the present invention;

FIG. 7(a) is a schematic representation of a logical ring showing the addresses of the stations and the direction of meter token rotation;

FIG. 7(b) is a schematic representation of a logical ring showing the addition of a master station;

FIG. 7(c) is a schematic representation of a logical ring showing the addition of a slave station.

GENERAL DESCRIPTION OF THE INVENTION

Figure 1:
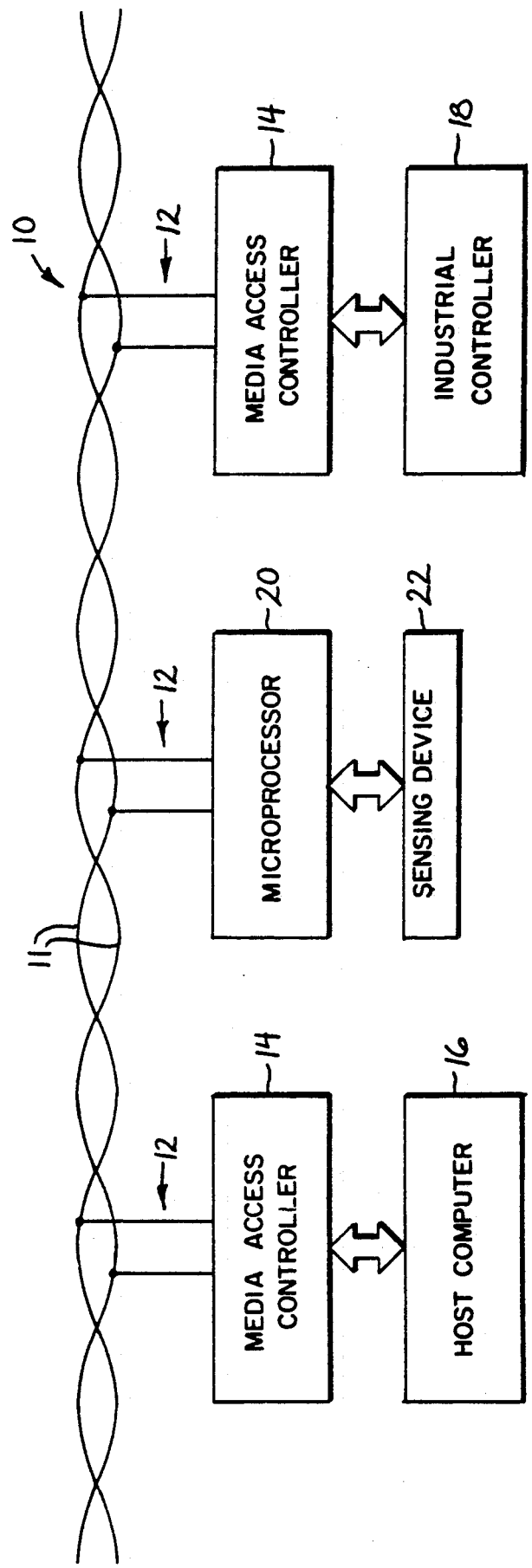
FIG. 1 is a pictorial view of the communications network of the present invention.

The local area network of the present invention is comprised of a set of stations which configure themselves into a logical ring so that a master token may be passed around the ring from station to station. Only the station currently holding the master token may originate a message on the network or solicit new stations for entry into the network.

This logical ring configuration is implemented by assigning each station a unique station number or address and passing the master token in ascending order of address. These same addresses are employed to identify the source and destination of messages transmitted on the network. It should be apparent to those skilled in the art that this logical ring configuration is independent of the particular medium of the network (wire, cable, fiber optic, etc.) or the network topology (ring, trunk, star, etc.).

Referring to FIG. 7(a), an example logical ring is formed containing four stations 302, 304, 306, and 308 having respective addresses 4, 10, 11, and 30. The stations are either master stations, as are 302 and 306, or slave stations, as are 304 and 308. Each master station stores the station address of its successor master station. For example, in the network of FIG. 7(a), station 302 stores the successor address of 11 corresponding to station 306. Likewise, station 306 stores a successor address of 4 identifying station 302.

Only master stations are allowed to send messages on the network, and at any one moment, only one of the master stations is allowed to send a message on the network to the other destination stations. This master station is said to possess the "master token". When holding the master token, each master station is permitted to send a certain number of messages as determined by a "token hold factor". After that number of messages has been sent or all the messages held by that master station are sent, the master token is passed to a successor master station by means of a token pass message which includes the address of the successor station. The arrows 311 and 312 between the master stations show the direction in which the master token is passed.

Only the master stations 302 and 306 are permitted to accept the master token. The slave stations 304 and 308 are not permitted to accept the master token and hence cannot originate messages. If the message sent by a master station requires immediate response from the destination station, the destination station, either master or slave, is given the opportunity to respond. Accordingly the slaves stations are shown positioned outside of the master token passing loop formed by arrows 311 and 312 but connected to the loop by the segments 307 for the purpose of responding to messages sent by master stations.

FIG. 7(b) illustrates the situation in which another master station 310 is added to the ring. As indicated by the dashed line 312, the master token is no longer passed from station 302 to station 304 but instead is passed through the new master station 310. Station 310 is added to the logical ring by means of a solicit message transmitted by station 302 when it has possession of the master token and the solicit token. A station in possession of the master token and the solicit token will send a solicit message to one address between its own address and that of its known successor, starting at its own address plus one. If no response is received, the station passes the master token to its successor but retains the solicit token for the next time it receives the master token. At that time the station will solicit as a potential successor by sending a solicit message to its address plus two, and so forth. When the station has solicited, as a potential successor, the address equal to its known successor minus one, it stops soliciting and passes the solicit token to its successor. When it next receives the solicit token, it again begins soliciting at its own address plus one.

In the preferred embodiment, there is no overt act of passing the solicit token. Instead, each station is programmed such that if it does not hear a solicitation message on the network during one complete revolution of the master token, it assumes that it has the solicit token and upon receiving the master token, may send a solicit message itself. For example, if station 302 has the master token and has not heard a solicit message since it last released the master token, then station 302 will transmit a solicit message, first, to address 5. If no response is received, station 302 will retain the right to solicit on each subsequent rotation of the master token, each time soliciting the address one higher than that previously solicited. When address 6 is solicited, station 310 responds and station 302 sets its successor to address 6. The solicit message from station 302 to station 310 includes the address 10 of station 302's previous successor, which station 310 adopts as its successor.

If the successor address passed to station 310 is not one greater than 310's address, station 310 may begin soliciting immediately upon obtaining the master token from 302.

FIG. 7(c) illustrates the situation in which a slave station 314 is added to the ring. As indicated by dashed line 316, the slave station 314 is originally both outside of the logical ring, indicating that the token is not passed to the slave station, and also unable to respond to messages even though it is physically connected to the communications medium. When slave station 314 receives a solicit message at its address, it responds with a negative acknowledgement ("NAK") and does not accept the token. Nevertheless, the slave station 314 may then begin responding to messages initiated by other stations.

The master station 302 receiving the NAK after soliciting the slave station 314 continues to solicit, on subsequent cycles of the ring as described above, until it reaches one address less than its current successor 306.

When the logical ring is first initiated, or after communications fail, the stations compete for the token on the basis of address. The station receiving the token begins the soliciting process. If a successor master station is found, the first soliciting station sends the successor station its own address as a successor.

DESCRIPTION OF THE PREFERRED EMBODIMENT

Referring to FIG. 1 the communications network includes a cabling system 10 which conveys information between the stations in the form of binary electrical signals. The cable 10 has four conductors: a two balanced digital channels 11 and a shield and a ground (not shown). The network messages are transmitted asynchronously in a serial format along the balanced digital channels 11 per the Electronic Industries Association standard RS-485, as is known in the art. Each station is connected in parallel to the cable 10 by means of short droplines 12 to simultaneously receive messages transmitted therealong The interconnection of the stations along cable 10 will henceforth be termed the "link".

Only a single message may be carried on the link at any given time. Accordingly, the stations must be coordinated so that only one is transmitting a message at any instant. This coordination of the stations is performed by the media access controller 14. As will be described in more detail below, the media access controller 14 controls the right to transmit information on the network insuring that only one station is transmitting at any time and that each station has a fair share of the link at regular intervals. Physically, the media access controller 14 may be located on a separate printed circuit board which connects to a host computer 16 or industrial controller 18 or other such device, or the functions of the media access controller 14 may be realized by a microprocessor 20 programmed to emulate the function of the media access controller 14. This latter approach is useful for low cost links where higher speed communications is not required.

The media access controller 14 provides a standard interface between the link and a host computer 16 or other such device such that the host computer 16 may transmit messages on the link without the need to attend to the protocols of the link, as previously described and which are performed by the media access controller 14.

HARDWARE DESCRIPTION

Figure 2:
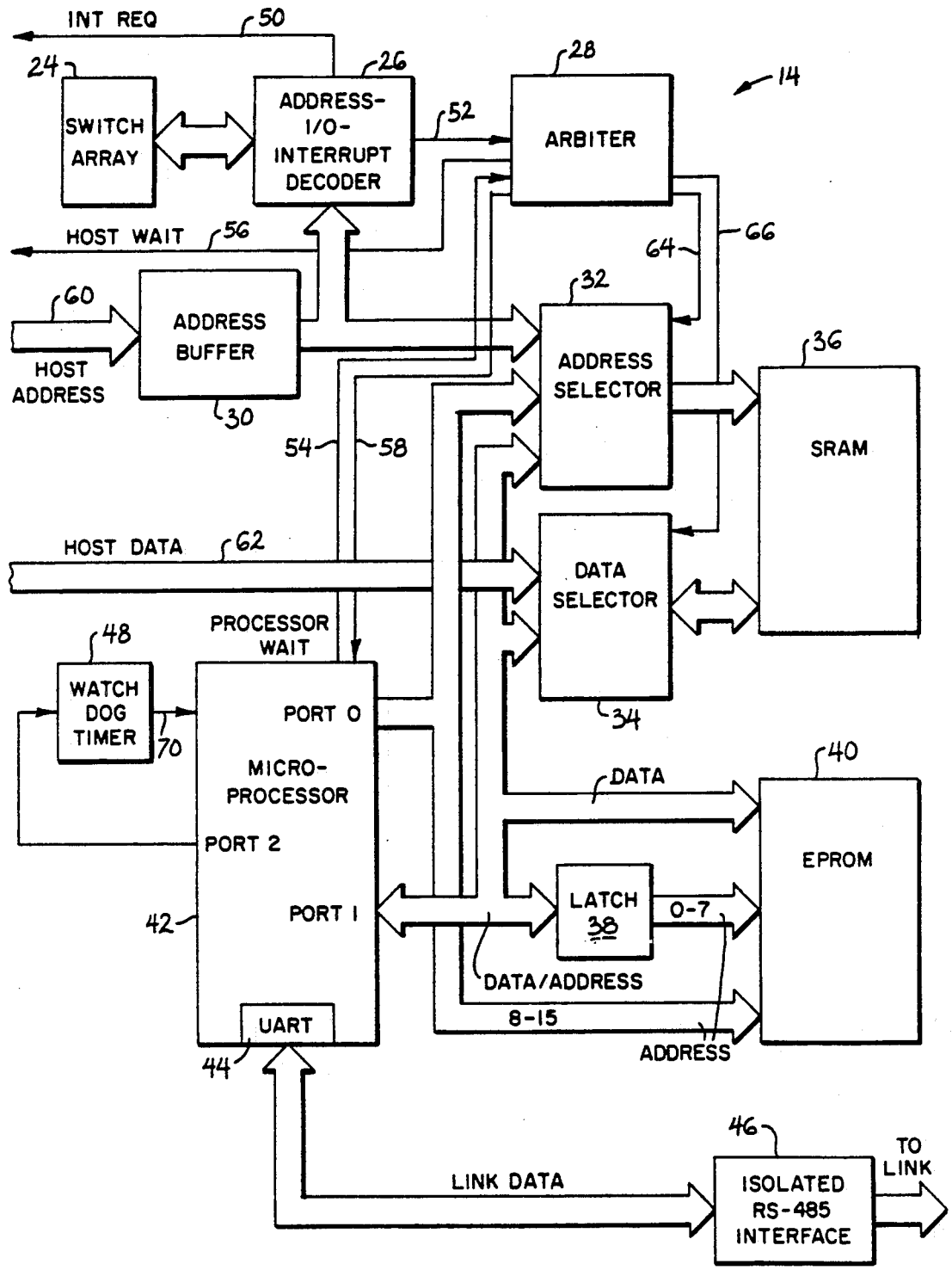
FIG. 2 is a block diagram of a media access controller which forms part of the network of FIG. 1.

Referring to FIG. 2, the media access controller 14 incorporated a microprocessor 42 which contains a Universal Asynchronous Receiver and Transmitter ("UART") 44 enabling it to communicate directly with the balanced digital channel 11 via an isolated RS-485 interface 46. Two 8-bit ports on the microprocessor 42 are combined to provide 16 bits of addressing capability. Address bits 8–15 are addressed by port 0. Address bits 0–7 are addressed by port 1 and held by latch 38. After address bits 0–7 have been latched, port 1 is used to write or read 8-bits of data. The 16-bits of address data may be used to address an erasable programmable read only memory ("EPROM") 40 which contains the operating instructions for the microprocessor 42 to enable it to carry out the protocol of the media access controller 14. Alternatively, the address lines may be used address data from a static random access memory ("SRAM") 36.

The SRAM 36 is shared with the host computer 16 such that either the microprocessor 42 or the host computer 16 may read or write information to or from the SRAM 36. Hence, the SRAM 36 may be used to communicate between the host computer 16 and the microprocessor 42. The SRAM 36 is shared by means of an address selector 32 and a data selector 34 which choose which machine: the microprocessor 42 or the host computer 16 is connected to the SRAM 36 at a given moment. The address selector 32 and data selector 34 are controlled by an SRAM arbiter 28 which reads requests for access by the microprocessor 42 and host computer 16 on request lines 54 and 52 respectively and selects between the requests. The machine whose request is not granted receives a wait signal on lines 58 or 56, to the microprocessor 42 or host 16 respectively. The request signal from the host computer is derived from the address lines 60 and control lines, not shown, of the host computer 16 which indicate that the host computer is attempting to address the SRAM 36. The particular address at which the SRAM 36 is located in the host computer's address space is determined by switch array 24. The data from the SRAM 36 is read by the microprocessor 42 via its port 1, which as noted, also serves to generate bits 0–7 of the 16 bits of address data.

One bit of port 2 of microprocessor 42 is output to a watchdog timer 48 which resets the microprocessor 42 if no activity from that port is detected for a certain length of time. The microprocessor is instructed to strobe the port 2 line periodically when its program is running properly. Hence the watchdog timer 48 may detect a lock-up of the microprocessor 42 as might be caused by entering an endless loop or other illegal state.

DESCRIPTION OF THE DATA STRUCTURES

Referring to FIG. 6(b), a message 200 transmitted on the link follows a specific format based on a series of fields comprised of 8-bit bytes. Four of these fields are comprised of control characters defined according to the link protocol as follows:

| Mnemonic | Meaning | Hexadecimal Value |
|---|---|---|
| STX | start of text | 02H |
| ETX | end of text | 03H |
| DLE | data link escape | 10H |

The first two fields of the message 200 are the control characters DLE and STX which together indicated the start of the message.

The third field 216 of the message 200 is the destination address of the message DSTN. Valid addresses may range from $80_H$ to $9F_H$. Hence 32 addresses may be obtained and a maximum of 32 station may be supported by the link.

The fourth field 218 of the message 200 is an 8-bit control byte. Referring to FIG. 6(c), the control byte 218 is comprised of a sequence bit 230, a 4-bit PDU Group Code, and a 3-bit PDU type defined as follows:

| PDU Group | PDU type | Meaning |
|---|---|---|
| $0000_B$ | | (Control Packets) |
| | $000_B$ | Token Pass (TOP) |
| | $001_B$ | Solicit Successor (SOS) |
| | $010_B$ | Claim Token (CTO) |
| $0001_B$ | | (Data Packets) |
| | $000_B$ | Send Data with Acknowledgement (SDA) 0–255 bytes |
| | $001_B$ | Send Data with Acknowledgement (SDA) 256–267 bytes |
| | $010_B$ | Send Data with no Acknowledgement (SDN) 0–255 bytes |
| | $011_B$ | Send Data with no Acknowledgement (SDN) 256–267 bytes |
| | $100_B$ | Send and Request Data (SRD) |
| $0011_B$ | | (Acknowledgements) |
| | $000_B$ | Acknowledge with no Data (ACK) |
| | $001_B$ | Acknowledge with Data (ACK) |
| | $010_B$ | Negative Acknowledgement-no memory (NAK) |
| | $011_B$ | Negative Acknowledgement-message too large (NAK) |
| | $100_B$ | Negative Acknowledgement-undefined or inactive LSAP (NAK) |
| | $101_B$ | Negative Acknowledgement-slave |

| PDU Group | PDU type | Meaning |
|---|---|---|
| | | module (NAK) |
| | 110$_B$ | Negative Acknowledgement-SRD or SDA not implemented (NAK) |

The sequence bit is used only by acknowledgement data messages (SDA and SRD) and is set to the opposite state for each new message to help detect duplicate messages.

Referring again to FIG. 6(b), the fifth field of the message 200 is the source link address (sstn) of the station sending the message. As with the destination address (dstn), the source link address may range from 80$_H$ to 9F$_H$.

The sixth field, which may be many words long depending on the message, is the data being sent. Referring to FIG. 6(a), the data field is comprised of a destination LSAP address 202 and a source LSAP 204 address. LSAP's are addresses used by the application programs running 14 the host computer 16 to distinguish messages among several applications sharing a station and are not distinguished or affected by the media access controller 14. The LSAP addresses 202 and 204 are followed by a size field 206 which carries the size of the following data string which may be up to 267 bytes long. This is followed by the actual data being transmitted 210.

The seventh and eighth fields are the control characters DLE and ETX described above which together indicated the end of the message. The ninth and tenth fields are error correction codes, specifically, a cyclic redundancy code that is well known in the art and used to detect errors in the transmitted message and hence improve link reliability.

Referring to FIG. 5, the microprocessor SRAM 36 shown in FIG. 2, contains a number of variables. The link timer limit 160 and slot timer limit 162 are values loaded into internal timers (not shown) in microprocessor 42 to time the period during which the media access controller 14 waits for certain responses to be described in more detail below. It is critical only that these values are not infinite; their lower bounds may be adjusted according to link speed and link efficiency as will be understood by those skilled in the art. The link timer limit 160 is made proportional to the station's address so as to reduce conflict during the token claiming process to be described below. The variables of successor and potential successor addresses, 164 and 166, hold respectively, the station's current successor and the address at which the station is currently soliciting for successors. If there is no successor, the successor address 166 will be the same address as that of the station itself. The variable of token hold factor 168 determines the maximum number of messages that a station holding the master token may send before passing the token to its successor. Smaller token hold factors generally reduce the time that a station must wait to send messages, but at the cost of increasing the time expended in sending a series of messages from a station. The above variables will be discussed further below.

SOFTWARE DESCRIPTION

As indicated above, the microprocessor 42 in the media access controller 14 executes a program stored in the EPROM 40 (FIG. 2) to carry out the protocol of the link. This software controls the sending of messages 200 to ensure that only one station is sending at any one time and that all stations have fair access to the network. This software also controls the addition of new stations to the link and ensures that messages are not lost and that duplicate stations are not on the link. The software is a single state machine routine.

Figure 3:
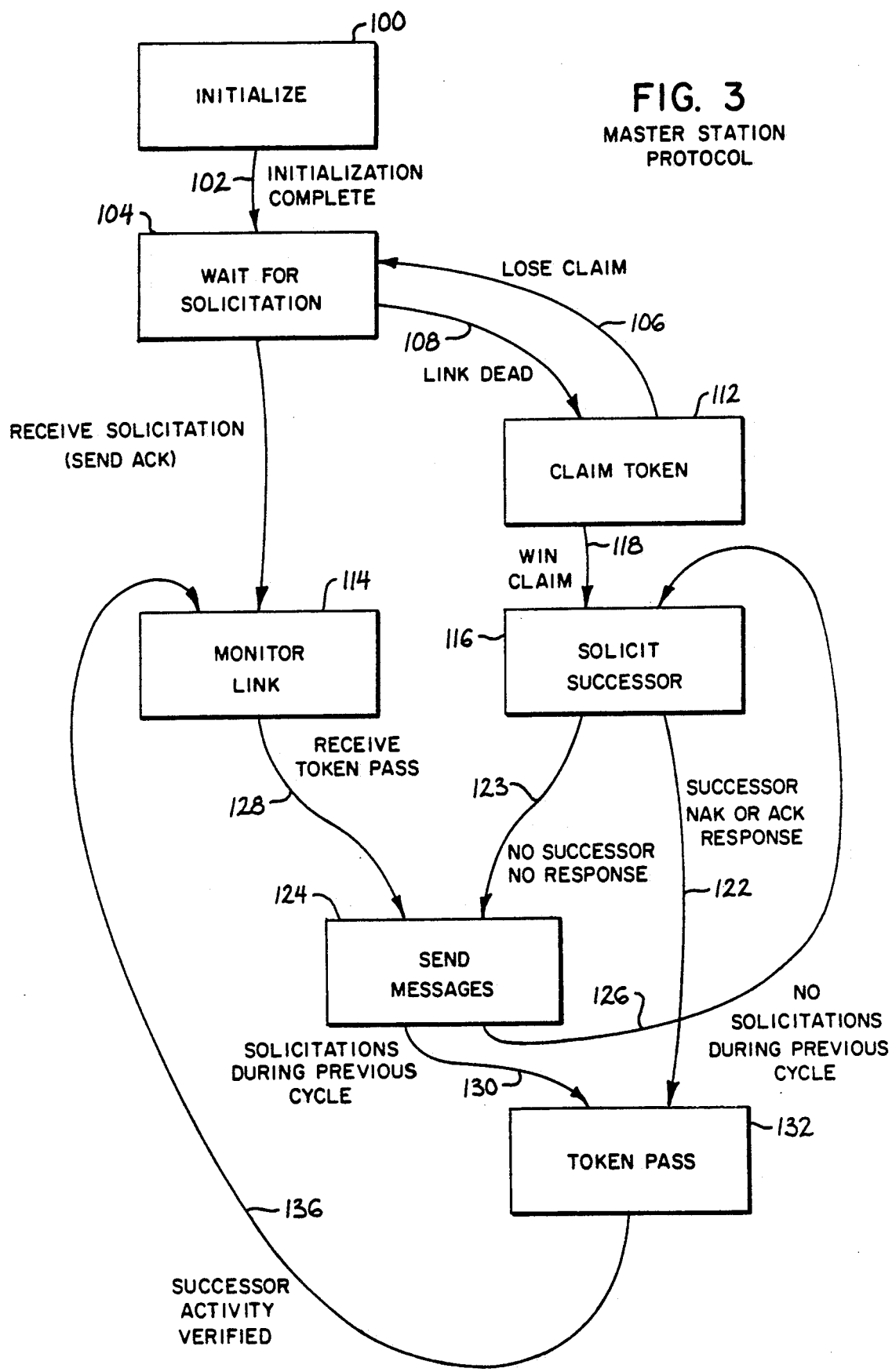
FIG. 3 is a state diagram of the master station protocol implemented by the media access controller of FIG. 2.

Referring to FIG. 3, the operation of the media access controller 14, when configured as master station, is illustrated. When the station is initialized, as indicated by state block 100, a diagnostic function is performed including checks of the SRAM 36. If these tests are successful, the initialization is complete and the program advances to the next state 104, as indicated by arrow 102, to wait for a solicitation message (SOS) as has been described above.

If an SOS message is received and addressed to the present station, an acknowledgement (ACK) signal is returned to the sending station and the present station enters the logical ring and may in the future receive the master token. The SOS message includes, in its data area 210, the address of the successor of the sending station which is now adopted by the present station.

It is possible that no SOS message will be received. Upon entering state 104, a Link Timer (not shown) is loaded with the link timer limit 160 and started counting toward zero to indicate how long the media access controller 14 has waited for a SOS message. If a sufficient time passes without receipt of an SOS message, the network may be dead. This could occur at initialization of the network, when no station has the token and hence no station may originate messages, or if during operation of the network the token gets lost as a result of link disruption. As indicated by transition arrow 108, if the Link Timer times out, it is assumed that the link is dead and an attempt is made to claim the token as indicated by state 112.

Claiming the token is done by transmitting a claim token (CTO) message, the structure of which has been described. Upon transmission of the CTO message, a Slot Timer (not shown) is loaded with the slot timer limit 162, started counting toward zero, and activity on the link is awaited. If activity is detected on the link, the program concludes that the token has been claimed by another station and returns to state 104 as indicated by arrow 106 to await a solicitation message. The Link Timer is initialized as before. If, on the other hand, no activity is heard by the time the Slot Timer times out, the present station claims the token, as indicated by arrow 118, and immediately seeks a successor station per state 116. The present station's potential successor address 164 is set to the next address after its own. This token claiming procedure is designed to enable the link to be rapidly reestablished.

At state 116, a solicit successor SOS message is transmitted to the potential successor address 164 if the successor address 166 indicates that the successor is the present station, i.e. there is no successor. An acknowledgment (ACK) or (NAK) is then awaited. If no response is received, or if a NAK is received and the station does not yet have a successor, the potential successor address 164 is incremented and the program proceeds to state 124 to send messages, as indicated by arrow 123.

At the message sending state 124, the station may transmit any messages that it has received from the host computer 16, up to a maximum determined by the token hold factor 168. The token hold factor 168 is intended to prevent one station from monopolizing the link and does so by limiting each station to a fixed number of messages after which the station must release the master token.

When all the messages have been transmitted or the token hold factor has been reached, or if there are no messages, the state 124 will be left. If the present station retains the solicit token, that is, no SOS messages have been heard on the previous passing of the master token about the link, then the program returns to the solicit successor state 116 and solicitation of the address as indicated by the potential successor address 164 is continued. If the station does not have the solicit token, the program passes from the send messages state 124 directly to the pass master token state 132 to be described further below.

Returning to the solicit successor state 116, successive addresses are solicited and if no successor is discovered, each time no response is received, the program passes to the send messages state 124 as before. If a ACK is received, however, the program moves to the token pass state 132 as indicated by arrow 122, sending a token pass (TOP) message to the new successor, as indicated by the value of the potential successor address 164, and recording the new successor as its successor in the successor address 166. After the station transmits the TOP message, the link is monitored for a period, as timed by the Slot Timer, to determined if any messages have been originated from the new successor confirming the success of the token pass. If no such activity is indicated, it is assumed that the token pass was a failure and two more tries are attempted. After three tries the failure state is entered (not shown).

If the token pass was successful as indicated by arrow 136, the controller begins monitoring the link as indicated by state 114. In the monitoring state the station evaluates every message on the link with its address, making the appropriate response. The messages that may be received are SRD, SDA, TOP, or SDN. Various responses are allowed depending the message format as has been discussed.

Referring now to FIG. 4, the operation of the media access controller 14 when configured as slave station is illustrated. The state diagram is substantially simpler, which permits optional further simplification of the media access controller hardware and firmware provided that the station is only to operate in the slave state.

Again, when the station is initialized on a number of diagnostic functions are performed. As in the master station mode, if those tests are successful, the program enters the wait for solicitation mode 154 as indicated by arrow 152. Upon receiving a SOS signal directed to its address, however, the slave station responds with a NAK signal and advances to state 158 where it monitors the link.

In the monitoring state, the slave station may respond to SDA and SRD commands as instructed, and to the TOP command with a NAK.

Both the master and slave stations monitor the link for duplicate address, that is message originating from other stations where the destination address of the message (dstn) is the same as the station's own address. The master station checks for duplicate stations when it is waiting for a solicit in state 104, when it is monitoring the link in state 114, and when it is soliciting a successor in state 116. If a duplicate node is detected, the master station proceeds to a fault state (not shown) and reports the fault. The station then proceeds to state 104 to wait for a solicitation. The slave station checks for duplicate stations when it is waiting for a solicitation in state 154, and when it is monitoring the link in state 158. If a duplicate node is detected, the slave station also proceeds to a fault state (not shown), reports the fault, then proceeds to state 154 to wait for a solicitation. This withdrawal from the link upon detection of a duplicate station at the withdrawing station's address reduces the chance of message collision.

The master station also checks for duplicate tokens as indicated by message activity by other stations when the particular station has the token and is monitoring the link while awaiting an ACK in state 116.

On occasion, a slave may convert itself to a master by responding to an SOS with an ACK. This is possible because, as shown in the state diagram of FIG. 3, the previous master station will periodically re-solicit all the addresses between itself and its known successors including slave stations in between those addresses, when it receives the solicit token.

The NAK response of the slave also allows certain masters to add the slave to an active node table (ANT) that may be compiled of all the other stations on the link. The active node table provides useful link statistics and can aid in re-initializing a link if there is a link failure. A detailed description of the compilation of a ANT is given in U.S. Pat. No. 4,747,100 cited above and hereby incorporated by reference. Although the slave is not an active node, it may be incorporated into an ANT to provide a list of slave stations to be used by certain applications.

A preferred embodiment of the invention has been described, but it should be apparent to those skilled in the art that many variations can be made without departing from the spirit of the invention. For example, as mentioned the media access controller 14 may be implemented in a variety of general purpose microprocessors or computers allowing for direct connection to the link via an RS485 adapter. Additional stations may be allowed for larger links.

COMPONENTS APPENDIX

| Component | Description |
|---|---|
| Microprocessor 42 | Z0880020VSC "Super-8" microprocessor manufactured by Zilog |
| EPROM 40 | 27C256 32Kx8 Erasable Programmable Read Only Memory |
| Address Decoder 26 | PAL20L8 Programmable Array Logic manufactured by Monolithic Memories |
| SRAM 36 | 32Kx8 Static Random Access Memory manufactured by Hitachi |
| Isolated RS-485 Interface | HCPL2601 Optical Isolator manufactured by Hewlitt-Packard |

We claim:

1. A method of communicating over a network formed by at least one master and slave station interconnected by a communications medium, comprising the steps of:

(a) passing a master token to each of the master stations in a predetermined order;

(b) enabling each master station to send a message on the network when it has possession of the master token;

(c) successively passing a solicit token to each of said master stations in a predetermined order;

(d) enabling each master station to send a solicit message on the network when it has possession of both the solicit token and the master token, said solicit message being directed to a recipient station connected to the communications medium but not one of those stations yet receiving the master token;

(e) enabling the recipient station which receives the solicit message to become one of said plurality of stations receiving the master token and the solicit token if the recipient station is a master station; and (f) enabling the recipient station which receives the solicit message to send a negative acknowledgment message on the communications medium if the recipient station is a slave station, without becoming one of said plurality of stations receiving the master token.

2. A slave station for use with a token passing logical ring network, which includes at least one master station connected to the network and wherein the master station may receive a master token enabling the master station to send a message on the network and wherein the master station may receive a solicit token enabling the master station to send a solicit message on the network, the slave station comprising:

(a) sending means for sending a message on the network;

(b) receiving means for receiving a message from the network;

(c) detector means coupled to the receiving means for determining the type of message that is received; and (d) means coupled to the detector means and the sending means for forming and sending a negative acknowledgement message when the station receives a solicit message.

3. A method of communicating over a network formed by a plurality of master stations interconnected by a communications medium, each master station having the link address, comprising the steps of:

(a) passing a master token and a solicit token to a first master station having a successor master station;

(b) enabling the first master station to send a solicit message on the network, said solicit message being directed to a recipient master station with a link address between that of the first master station and that of a successor master station;

(c) enabling each recipient master station which receives a solicit message to become one of said plurality of master stations receiving the master token and the solicit token; and (d) passing the solicit token to the recipient master station if the link address of the successor station is not one greater than the link address of the recipient station.

4. The method of claim 3 wherein the successor master station is the same as the first master station.

5. A station for use with a token passing logical ring network, which includes at least one master station connected to the network and wherein the master station may receive a master token enabling the master station to send a message on the network and wherein the master station may receive a solicit token enabling the master station to send a solicit message on the network, the station comprising:

(a) sending means for sending a message on the network;

(b) receiving means for receiving the message from the network;

(c) detector coupled to the receiving means for determining the type of message that is received; and (d) means coupled to the detector means and the sending means for forming and sending a negative acknowledgement message when the station receives a solicit message if the station is configured as a slave station.

(e) means coupled to the detector means and the sending means for forming and sending an acknowledgement message when the station receives the solicit message if the station is configured as a master station.

* * * * *

UNITED STATES PATENT AND TRADEMARK OFFICE
CERTIFICATE OF CORRECTION

PATENT NO. : 5,012,468

DATED : April 30, 1991

INVENTOR(S) : Siegel, et al.

It is certified that error appears in the above-identified patent and that said Letters Patent is hereby corrected as shown below:

| | |
|---|---|
| Col. 2, line 65 | Delete the slash "/" marks. |
| Col. 3, line 3 | Change "meter" to --master--. |
| Col. 11, line 25 | Delete "network". |

Signed and Sealed this

Fifteenth Day of September, 1992

Attest:

DOUGLAS B. COMER

*Attesting Officer*    *Acting Commissioner of Patents and Trademarks*